United States Patent
Northrop et al.

(10) Patent No.: US 9,635,831 B2
(45) Date of Patent: May 2, 2017

(54) PET HOUSING WITH ZIPPERED CLOSURE

(75) Inventors: Melaney Northrop, Mansfield, TX (US); Alex Lin, Arlington, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 1337 days.

(21) Appl. No.: 12/350,285

(22) Filed: Jan. 8, 2009

(65) Prior Publication Data

US 2011/0017145 A1    Jan. 27, 2011

(51) Int. Cl.
*A01K 1/02*    (2006.01)

(52) U.S. Cl.
CPC .................. *A01K 1/0254* (2013.01)

(58) Field of Classification Search
CPC ...... A01K 1/0254; A45C 7/00; A45C 7/0022; A45C 7/005; A45C 7/009; A45C 2007/0013
USPC ........ 119/496, 497, 498; 190/903, 107, 103; 220/4.28, 6, 7, 9.1, 9.2, 9.3, 666, 676, 220/752, 755, 4.08, 916, 4.07, 4.26, 4.33
See application file for complete search history.

(56) References Cited

U.S. PATENT DOCUMENTS

| | | | | |
|---|---|---|---|---|
| 2,536,169 A | * | 1/1951 | Gray | A45C 3/00 190/103 |
| 3,407,961 A | | 10/1968 | Box | |
| 3,490,417 A | | 1/1970 | Swinney | |
| 4,295,302 A | * | 10/1981 | Liu | E04H 15/20 52/2.21 |
| 4,472,870 A | * | 9/1984 | Kotkins, Jr. | 29/445 |
| 4,549,589 A | * | 10/1985 | Nguyen | 206/316.2 |
| 4,569,362 A | * | 2/1986 | Fidler, Jr. | 135/126 |
| 4,852,520 A | | 8/1989 | Goetz | |
| 5,154,137 A | | 10/1992 | Stanaland | |
| 5,462,015 A | | 10/1995 | Murphy | |
| 5,620,069 A | * | 4/1997 | Hurwitz | A45C 3/00 150/130 |
| 5,671,698 A | | 9/1997 | Farrugia | |
| 5,881,678 A | | 3/1999 | Morley | |
| 5,941,195 A | | 8/1999 | Martz | |
| 6,021,740 A | | 2/2000 | Martz | |
| 6,076,485 A | | 6/2000 | Peeples et al. | |
| 6,155,206 A | | 12/2000 | Godshaw | |
| 6,182,611 B1 | | 2/2001 | Marchioro | |
| 6,286,461 B1 | | 9/2001 | Martz | |
| 6,427,631 B1 | | 8/2002 | Ross | |

(Continued)

*Primary Examiner* — Monica Williams
(74) *Attorney, Agent, or Firm* — Global IP Counselors, LLP

(57) ABSTRACT

A pet housing includes a top portion having a continuous edge and a bottom portion having a continuous edge. A middle portion is disposed between the top and bottom portions. The middle portion includes a continuous top edge and a continuous bottom edge. A first zipper is operable between an open and closed position to selectively interconnect the top portion continuous edge to the middle portion continuous top edge. A second zipper is operable between an open and closed position to selectively interconnect the bottom portion continuous edge to the middle portion continuous bottom edge. When the zippers are in the closed position, the top, bottom and middle portions form an enclosed area. When the zippers are in the open position, the top and bottom portions are completely detachable from the middle portion to allow the portions to nest.

11 Claims, 5 Drawing Sheets

(56) References Cited

U.S. PATENT DOCUMENTS

| | | |
|---|---|---|
| 6,446,577 B1 | 9/2002 | Salahor |
| 6,539,895 B2 * | 4/2003 | Hoagland ............... 119/453 |
| 6,571,740 B1 | 6/2003 | Kinder et al. |
| 6,647,925 B1 | 11/2003 | Waiters |
| 6,715,446 B2 | 4/2004 | Chou |
| 7,021,243 B2 * | 4/2006 | Harper et al. ............ 119/498 |
| 7,578,264 B2 * | 8/2009 | Guard ..................... 119/496 |
| 2002/0030052 A1 * | 3/2002 | Joo-Tai ..................... 220/9.2 |
| 2003/0127059 A1 * | 7/2003 | Smith, Jr. ........ A01K 1/0254 |
| | | 119/496 |
| 2004/0094589 A1 * | 5/2004 | Fricano ..................... 224/404 |
| 2008/0066687 A1 * | 3/2008 | Leung ..................... 119/28.5 |
| 2008/0066689 A1 | 3/2008 | Martz |
| 2008/0245312 A1 * | 10/2008 | Leung et al. ............. 119/497 |

* cited by examiner

PET HOUSING WITH ZIPPERED CLOSURE

TECHNICAL FIELD OF THE INVENTION

The present invention relates to pet housings, such as, for example, a pet kennel, and more particularly to a pet housing having portions interconnected by a zipper and which are nestable for compact storage, shipping and point of sale display.

BACKGROUND OF THE INVENTION

A variety of pet kennels having connectable upper and lower portions have been designed in order to allow for compact storage of these components. These kennel designs typically require a user to connect the upper and lower portions either with a latch or fastener such as nuts and bolts. Such fasteners typically require the use of tools to complete the assembly, and such fasteners may be easily lost.

Pet kennels are also designed in upper and lower portions to allow for compact storage, shipping and point of sale display. The size or height of the nested configuration of the upper and lower portions is generally equal to one half of the height of the assembled kennel. Therefore, the height of the nested configuration of the portions of the kennel cannot be made less than approximately one half the total height of the kennel. Also, in the nested configuration, the entry way door of the kennel must be detached and removed from the kennel. The doors are often misplaced or lost, and there are assembly requirements to reconnect the door to the kennel when in the assembled position.

Therefore, a need exists for a pet kennel which is easy to assemble, and has improved nestability of component parts.

SUMMARY OF THE INVENTION

In accordance with the present invention, a pet housing includes a top portion having a continuous edge. A bottom portion is provided and has a continuous edge. A middle portion is disposed between the top and bottom portions. The middle portion includes a continuous top edge and a continuous bottom edge. A first zipper is operable between an open and closed position to selectively interconnect the top portion continuous edge to the middle portion continuous top edge. A second zipper is operable between an open and closed position to selectively interconnect the bottom portion continuous edge to the middle portion continuous bottom edge. When the zippers are in the closed position, the top, bottom and middle portions form an enclosed area. When the zippers are in the open position, the top and bottom portions are completely detachable from the middle portion to allow the portions to nest.

BRIEF DESCRIPTION OF THE DRAWINGS

For a more complete understanding of the present invention and for further advantages thereof, reference is now made to the following description of the preferred embodiments taken in conjunction with the accompanying drawing in which.

DESCRIPTION OF THE PREFERRED EMBODIMENTS

Figure 1:
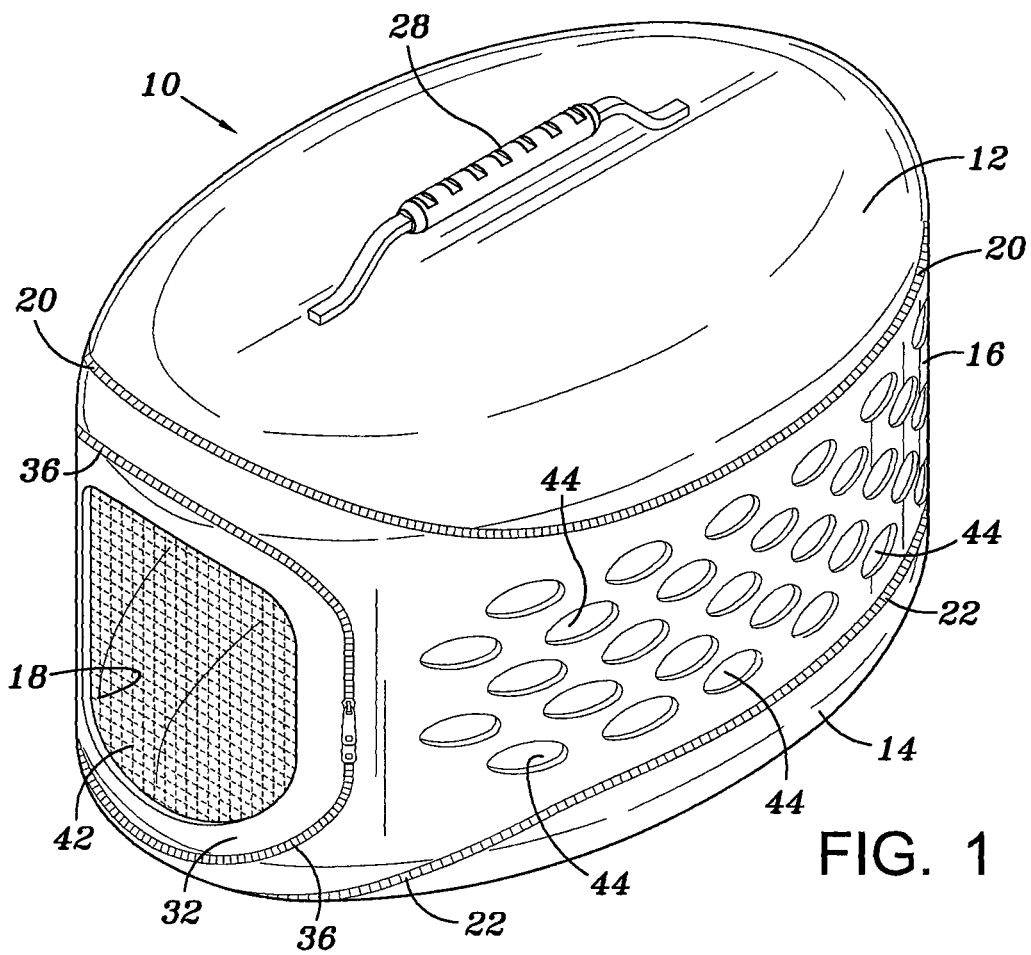
FIG. 1 is a perspective view of the present pet housing in the assembled position.
Figure 2:
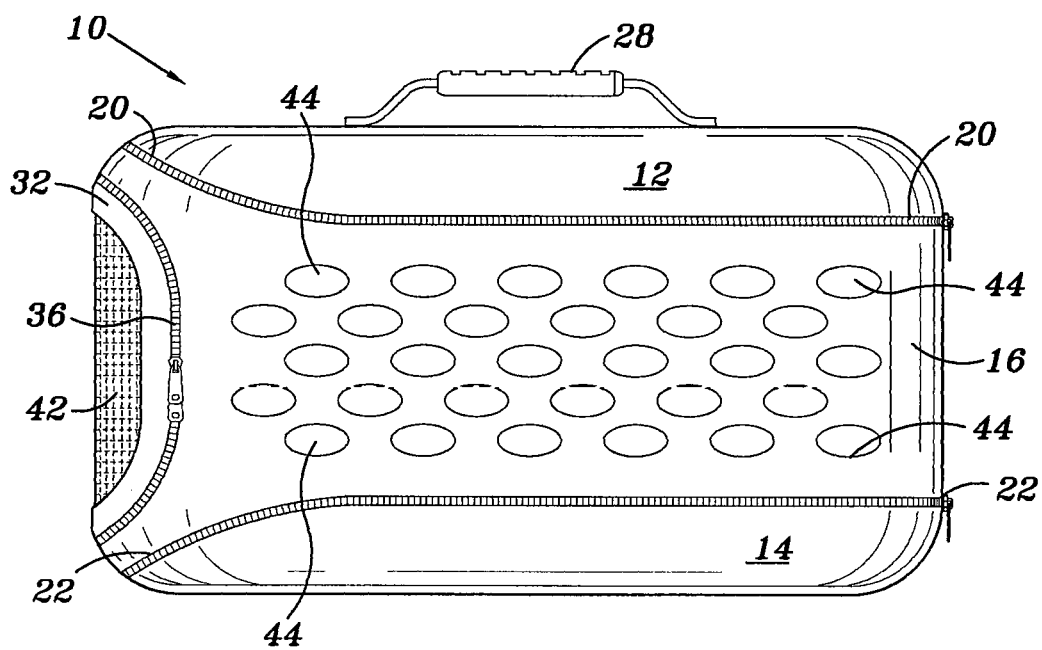
FIG. 2 is a right side elevational view thereof, the left side elevational view being a mirror image thereof.
Figure 3:
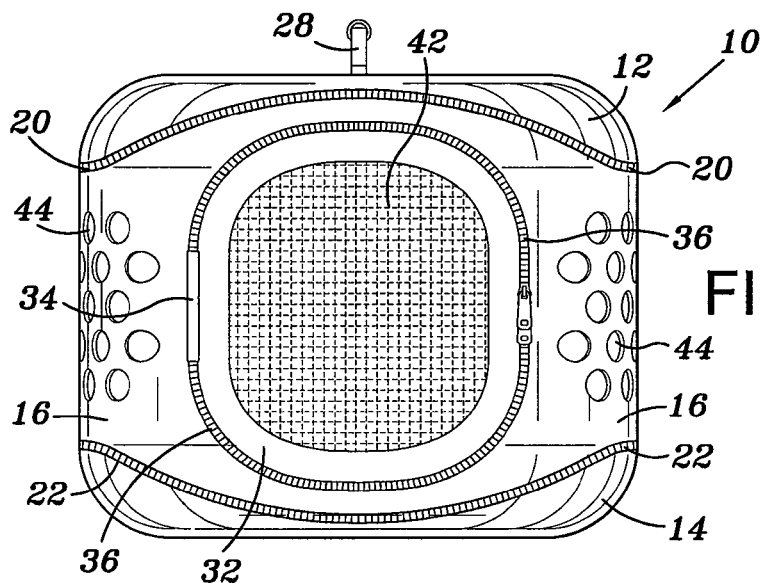
FIG. 3 is a front elevational view thereof.
Figure 4:
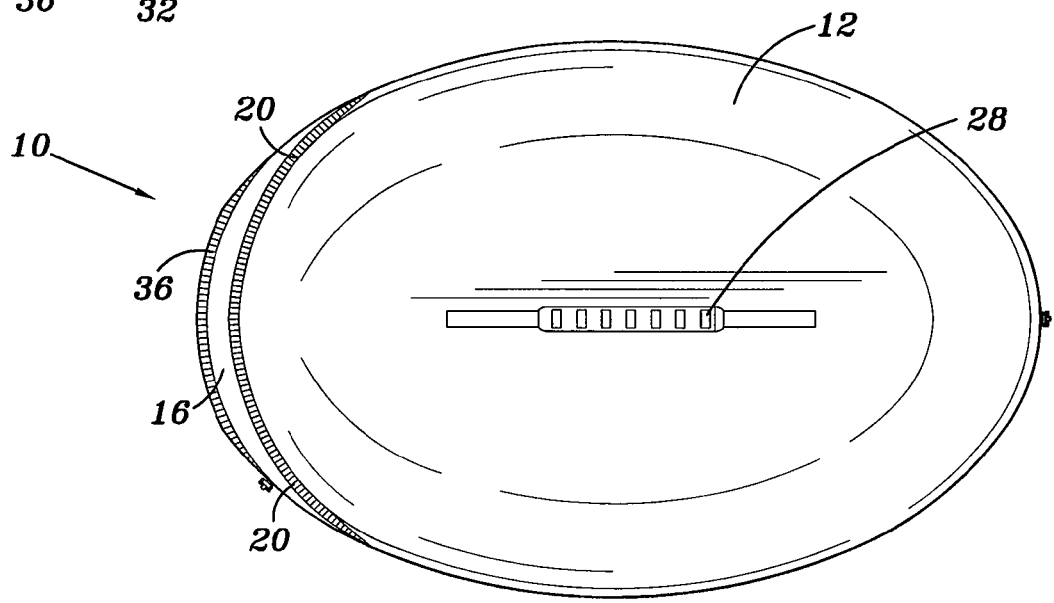
FIG. 4 is a top plan view thereof.

Referring simultaneously to FIGS. 1-5, the present pet housing is illustrated, and is generally identified by the numeral 10. As used herein, the term "pet housing" or "housing" includes, for example, but is not limited to, a pet kennel, pet shelter or pet carrier. Housing 10 includes a top portion 12, a bottom portion 14 and a middle portion 16. When assembled, portions 12, 14 and 16 form an enclosed area 18 for containing a pet. Top portion 12 and bottom portion 14 are essentially the same size and shape to accommodate nesting.

Top portion 12 is selectively interconnected to middle portion 16 using a first zipper 20. Bottom portion 14 of housing 10 is interconnected to middle portion 16 utilizing a second zipper 22. Zippers 20 and 22 extend around the entire housing 10, and allow portions 12, 14 and 16 to be completely detachable from one another for purposes of nesting for storage, shipping and point of sale display of housing 10.

Top portion 12 of housing 10 includes a handle 28. Middle portion 16 of housing 10 includes an entrance way 30 to enclosed area 18. Entrance way 30 is selectively closable utilizing a door flap 32 which is hingedly attached to middle portion 16 utilizing a hinge 34. Door flap 32 is selectively secured to middle portion 16 of housing 10 in a closed position utilizing a zipper 36. Zipper 36 includes teeth 38 and 40. Door flap 32 includes a ventilation mesh 42. Door flap 32 is contained within middle portion 16 and is secured to middle portion 16 to ensure that door flap 32 is not missplaced or lost when housing 10 is dissassembled.

Middle portion 16 of housing 10 further includes a plurality of ventilation openings 44.

Figure 6:
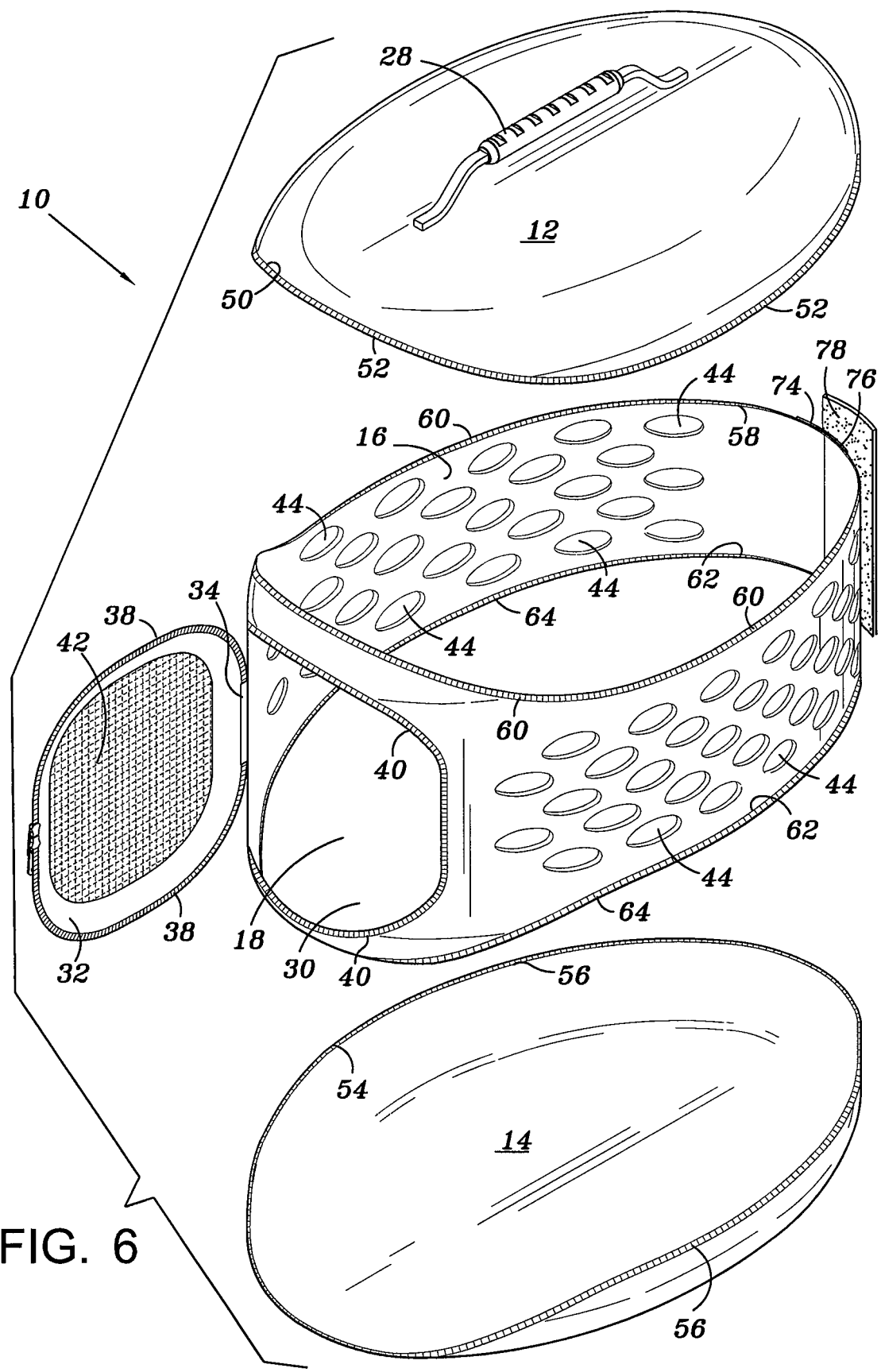
FIG. 6 is an exploded perspective view of the present pet housing illustrated in FIG. 1.

Referring simultaneously to FIGS. 1 and 6, top portion 12 includes a continuous edge 50 to which is attached a row of zipper teeth 52. Bottom portion 14 includes a continuous edge 54 to which is attached a row of zipper teeth 56. Middle portion 16 of housing 10 includes a top continuous edge 58 to which is attached a row zipper teeth 60. Middle portion 16 further includes a bottom continuous edge 62 to which is attached a row of zipper teeth 64. Zipper teeth 52 and 60 comprise zipper 20. Zipper teeth 56 and 64 comprise zipper 22. Zipper teeth 52 extend completely around the edge 50 of top portion 12. Similarly, zipper teeth 56 extend completely around edge 54 of bottom portion 14. Zipper teeth 60 and 64 extend continuously around edges 58 and 62, respectively, of middle portion 16. Therefore, it can be seen that top portion 12 and bottom portion 14 are completely severable from middle portion 16 of housing 10 when zippers 20 and 22 are in an open position. Portions 12, 14 and 16 are integrally connected to one another when zippers 20 and 22 are in a closed position.

Figure 5:
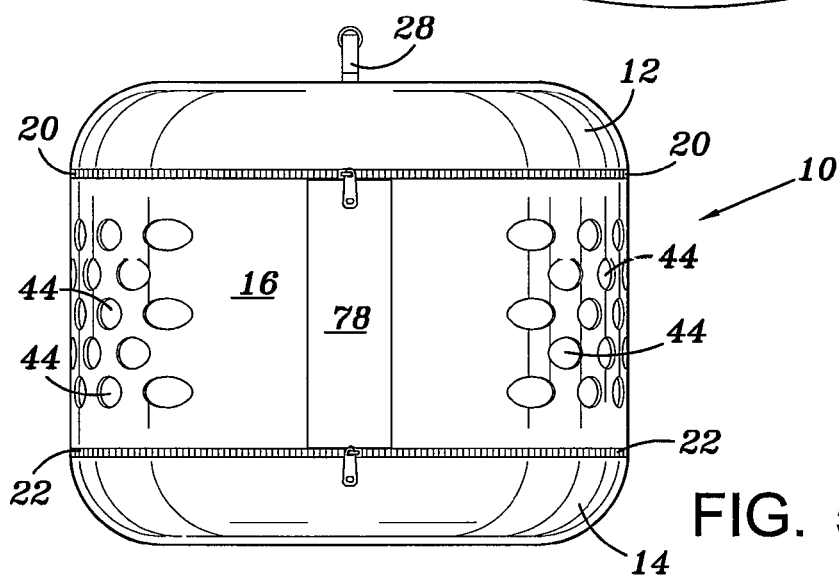
FIG. 5 is a rear elevational view thereof.
Figure 7:
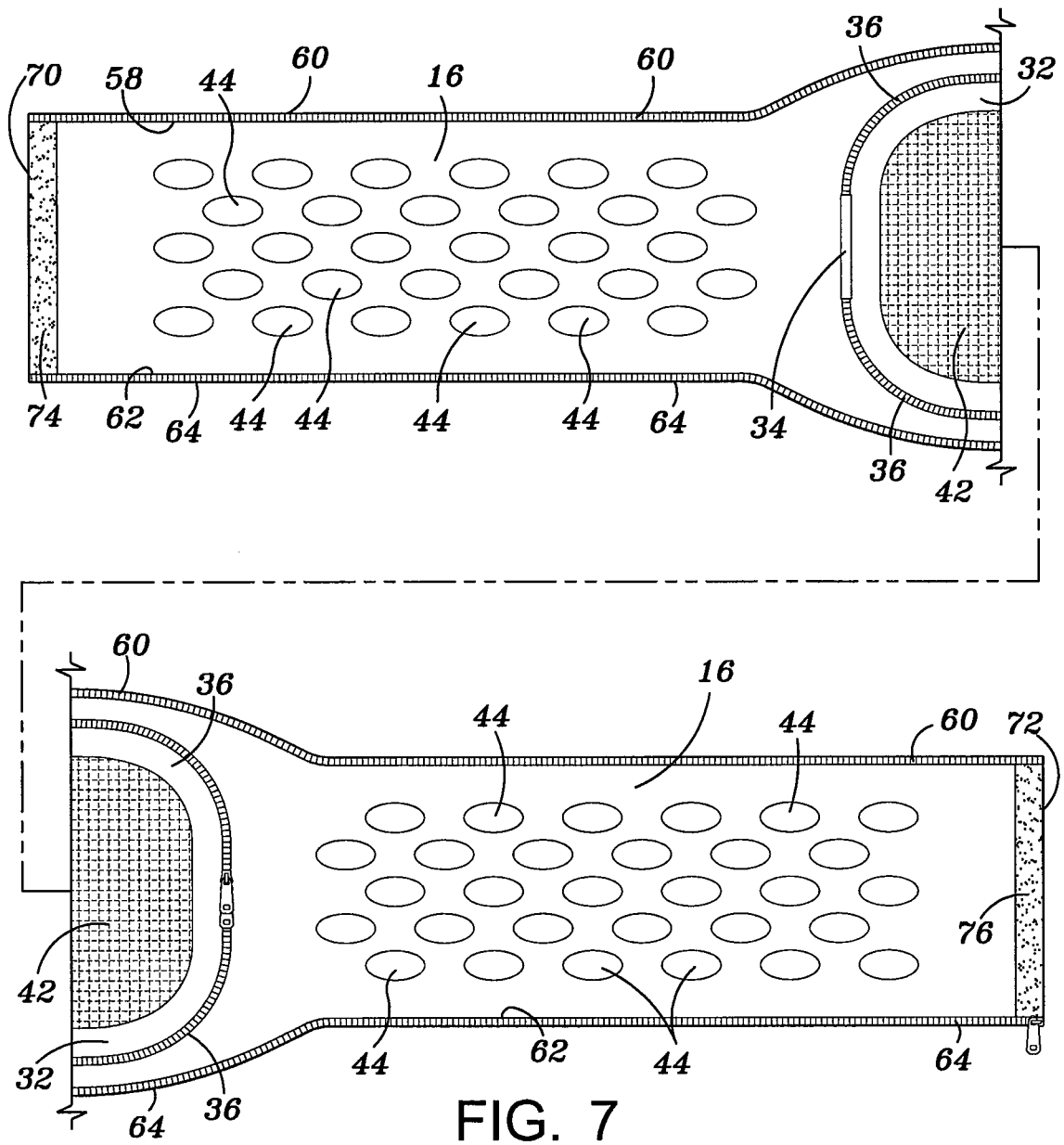
FIG. 7 is a side elevational view of the entire middle portion of the present pet housing.

FIG. 6 illustrates door flap 32 in an open position such that zipper 36 is open to thereby provide access to enclosed area 18 of housing 10. FIG. 7 illustrates middle portion 16 detached from top portion 12 and bottom portion 14 of housing 10. Door flap 32 is in a closed position with zipper 36 in the closed position. Middle portion 16 includes ends 70 and 72 to which are attached a fastener such as for example, a Velcro® strip 74 and 76, respectively. Ends 70 and 72 are attached using a Velcro® strip attachment 78 (FIG. 5).

Figure 8:
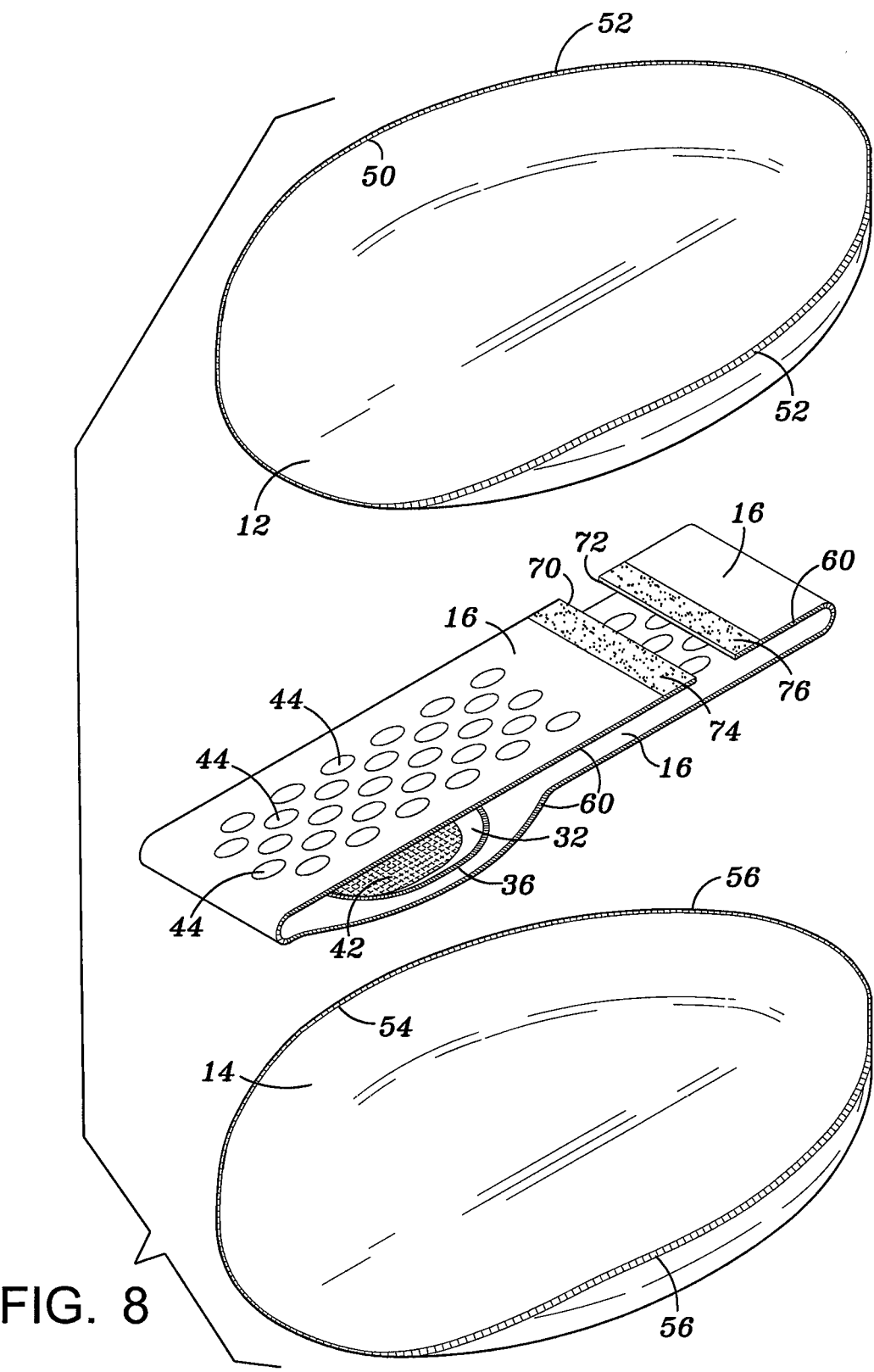
FIG. 8 is an exploded perspective view of the disconnected top, bottom and middle portions of the present pet housing in the nested position.

FIG. 8 illustrates housing 10 in a nested position of top portion 12, bottom portion 14 and middle portion 16. Top portion 12 is turned upside down to mate with bottom portion 14. Middle portion 16 is folded and inserted between top portion 12 and bottom portion 14 to provide for a compact configuration for storage, shipping and point of sale display for housing 10. Since top portion 12 and bottom portion 14 are essentially the same size, portions 12 and 14 nest together with minimal separation between these components. Middle portion 16 is easily foldable and inserted between nested top portion 12 and bottom portion 14.

Portions 12, 14 and 16 may comprise plastic sheet material such as, for example, ethylene-vinyl acetate (EVA), EVA foam, foamed poly-ethylene, PVC, nitrile rubber and nylon. Portions 12, 14 and 16 may include different colored and patterned materials to create a variety of asthetically pleasing looks and assortments for housing 10.

Bottom portion 14 of housing 10 can be used independently of housing 10 as a pet bed. Middle portion 16 together with bottom portion 14 can be used without top portion 12 as a pet exercise pen.

The invention claimed is:

1. A pet housing comprising:
a top portion comprising a handle and having a first edge, the handle being disposed on a top surface of the ton portion:
a bottom portion having a second edge, the first edge being a downwardly extending edge and the second edge being an upwardly extending edge when the pet housing is in an upright and assembled state;
a middle portion structured to be disposed between the top and bottom portions to form an enclosed area, the middle portion having a top edge and a bottom edge, the middle portion being detachable from the top and bottom portions, the top portion being configured to be inverted so that the top surface of the top portion faces and is nested with the bottom portion when the middle portion is detached from the top and bottom portions:
a first zipper operable between an open position and a closed position, the first edge of the top portion and the top edge of the middle portion being interconnected in the closed position of the first zipper and being detached from one another in the open position of the first zipper; and
a second zipper operable between an open position and a closed position, the second edge of the bottom portion and the bottom edge of the middle portion being interconnected in the closed position of the second zipper and being detached from one another in the open position of the second zipper.

2. The pet housing of claim 1, wherein
the middle portion comprises a doorway and a door flap, the door flap being structured to be situated in the doorway and to be closable by a zipper.

3. The pet housing of claim 1, wherein
the top and bottom portions have substantially the same size and shape to accommodate nesting of the top and bottom portions.

4. The pet housing of claim 3, wherein
the middle portion is structured to be nestable between the top and bottom portions.

5. The pet toy of claim 3, wherein
the top and bottom portions have shapes that are substantially mirror images such that the top portion is substantially entirely nestable with the bottom portion.

6. The pet housing of claim 1, wherein
the middle portion has a pair of edges and is structured to be disposable between the first and second portions to form an enclosed area.

7. The pet housing of claim 1, wherein
the top, bottom and middle portions comprise plastic sheet material.

8. The pet housing of claim 1, wherein the first zipper includes teeth extending completely around the first edge of the top portion and the top edge of the middle portion, and the second zipper includes teeth extending completely around the second edge of the bottom portion and the bottom edge of the middle portion.

9. The pet toy of claim 1, wherein
the middle portion includes a plurality of ventilation openings.

10. The pet toy of claim 1, wherein
the middle portion is configured to be folded and inserted between the top and bottom portions when the top and bottom portion are nested.

11. The pet toy of claim 1, wherein
the top surface of the top portion contacts an inner surface of the bottom portion when the top and bottom portions are nested.

* * * * *